United States Patent
Arthan et al.

(10) Patent No.: US 6,782,103 B1
(45) Date of Patent: Aug. 24, 2004

(54) CRYPTOGRAPHIC KEY MANAGEMENT

(75) Inventors: Robin Denis Arthan, Twyford (GB); Alexander James Robinson, Reading (GB); Thomas Anthony Parker, Calne (GB)

(73) Assignee: Fujitsu Services Limited, London (GB)

( * ) Notice: Subject to any disclaimer, the term of this patent is extended or adjusted under 35 U.S.C. 154(b) by 890 days.

(21) Appl. No.: 09/696,158

(22) Filed: Oct. 25, 2000

(30) Foreign Application Priority Data

Dec. 17, 1999 (GB) .............................................. 9929748

(51) Int. Cl.[7] .............................................. G06F 17/00
(52) U.S. Cl. ........................ 380/278; 380/286; 713/121
(58) Field of Search ................................ 713/200–202, 713/168–170; 380/277–286, 44–47

(56) References Cited

U.S. PATENT DOCUMENTS 4,972,472 A    11/1990   Brown (List continued on next page.)

FOREIGN PATENT DOCUMENTS

EP     1 011 223 A1    6/2000

(List continued on next page.)

OTHER PUBLICATIONS

Kim et al., Design and implementation of a private and public key crypto processor and its application to a security system, Consumer Electronics, IEEE Transactions on, vol. 50, Issue 1, Feb. 2004, pp. 214–224.*

(List continued on next page.)

*Primary Examiner*—David Jung
(74) *Attorney, Agent, or Firm*—Barnes & Thornburg LLP

(57) ABSTRACT

Business data flows from one computer system (1) to another (2) and its integrity can be protected by cryptographic means, such as digital signatures. In particular, a source system (1) may use a private key (DSPR) to sign outgoing data, and a destination system (2) may use a public key (DSPU) to verify incoming data. For security purposes all keys should be changed at scheduled times calculated using factors including key lifetime (from which is calculated the key expiry time) and key delivery time. If a key is compromised it needs to be changed at other than the scheduled time, and in general this will result in calculation of a new scheduled key change time. If a DSPR key is delivered to the source system (1) encrypted by a key encryption key (KEK), then change to the KEK key will in general also be needed upon compromise of the DSPR key. A new key changetime calculation can be avoided if another public key/private key pair is pre-generated and the public key part pre-supplied to the destination system (2), where it is stored as a spare. When the existing private key (DSPR) is compromised, the new private key corresponding to the spare is supplied to the source system (1) and can be put into use immediately. In this case the expiry time of the spare public key will be substantially the same as that of the original public key, as it will deemed to have been in use as of delivery, and recalculation of the key changetime will not be required. Preferably a public key in use at the destination system (2) is not revoked immediately upon compromise of the corresponding private key, in order to enable messages signed by that private key to be verified at the destination system, using the corresponding public key, during a predetermined time interval (message latency) after signing. A maximum value for the message latency may be set and used as another factor in the scheduled key change time calculation.

8 Claims, 1 Drawing Sheet

U.S. PATENT DOCUMENTS

| | | | |
|---|---|---|---|
| 5,404,403 A | | 4/1995 | Bright |
| 5,761,306 A | | 6/1998 | Lewis |
| 5,867,578 A | | 2/1999 | Brickell |
| 6,745,330 B1 | * | 6/2004 | Maillot .................... 713/200 |
| 6,745,331 B1 | * | 6/2004 | Silverbrook ............... 713/200 |
| 6,745,334 B1 | * | 6/2004 | Ikegami .................... 713/202 |

FOREIGN PATENT DOCUMENTS

| | | |
|---|---|---|
| GB | 2 324 449 | 10/1998 |
| WO | WO 00/25475 A1 | 5/2000 |

OTHER PUBLICATIONS

Jeong et al., VLSI array algorithms and architectures for RSA modular multiplication, VLSI Systems, IEEE Transactions on, vol. 5, Issue 2, Jun. 1997, pp. 211–217.*

McLoone et al., High–performance FPGA implementation of DES using novel method for implementing the key schedule, Circuits, Devices and Systems, IEE Proceedings, vol. 150, Issue 5, Oct. 6, 2003, pp. 373–378.*

* cited by examiner

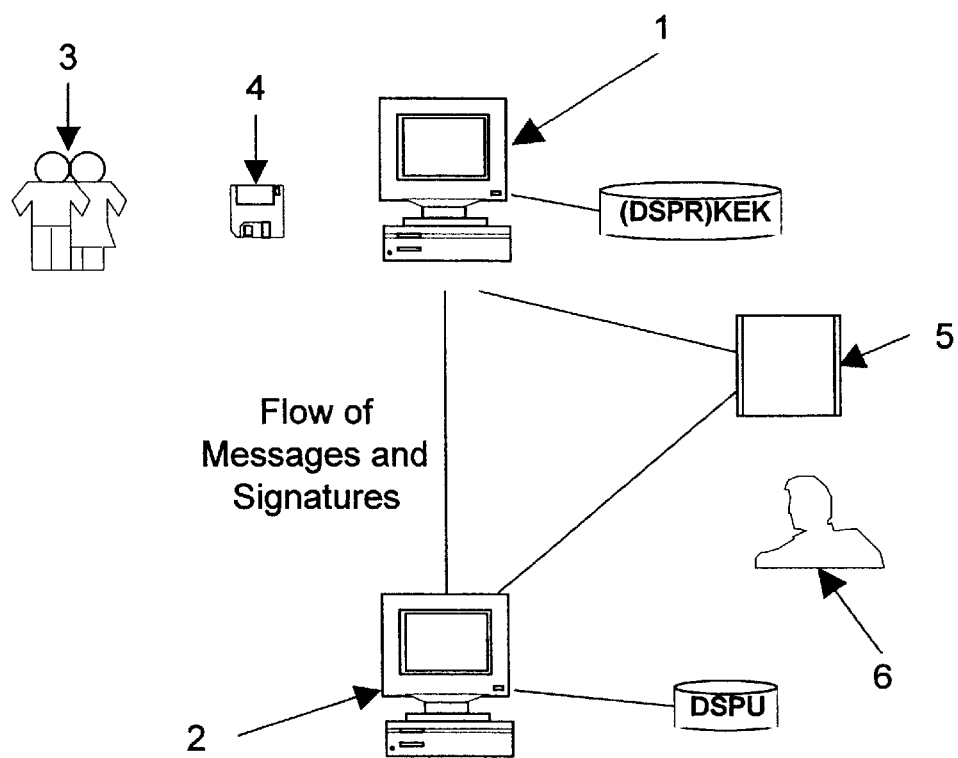

CRYPTOGRAPHIC KEY MANAGEMENT

BACKGROUND OF THE INVENTION

This invention relates to cryptographic key management and in particular to the scheduling of changes to cryptographic keys in a business system.

Such a business system may simply involve flow of business data from one computer system (a source system) to another computer system (a destination system), although in practice the data flow may be part of a much more complex system. Various techniques, such as symmetric or asymmetric encryption, or digital signatures, may be used to protect the integrity (confidentiality) of the data. Digital signatures also provide authentication of data, i.e. that it came from a particular source.

In symmetric encryption the same key is used to decrypt data as was used to encrypt it, so the key must be known only to the sender and the recipient.

In asymmetric encryption data is encrypted with one key and decrypted with another, these being the private key and the public key. Only the owner of the private key can decrypt data encrypted with the public key. Thus anyone can encrypt a message with the public key and be sure that the encrypted message can only be decrypted by the intended recipient. However, if the owner of the private key encrypts data with the private key, it can be decrypted by anyone using the public key. The fact that the process yields valid data proves that the message came from the owner of the private key and thus the encrypted data can be construed as a signature of the private key owner.

Digital signatures are similar to asymmetric encryption in that a two-part key is used, one being public and the other private. The owner of the private key uses it to generate a signature which it attaches to some other data. A recipient of the data can use the public key to verify the data came from the owner of the private key. Thus when using digital signatures (DS), the source system may use a private key DSPR to sign outgoing data and the destination system may use a public key DSPU to verify incoming data.

In practice the cryptography may be more complex. For example, the source system may embed a public key certificate in the signature it sends with each message. This certificate would be used to verify the data and would itself be verified against a Certification Authority public key, which effectively plays the same role as the DSPU.

The management of all keys is under the control of a security officer of the business system, who uses automated or manual procedures and protocols to arrange for delivery and installation of key material.

Good cryptographic practice requires all keys be changed at regular intervals, but if a key becomes compromised then it needs to be changed at other than the appropriate regular interval. The present invention is concerned with scheduling changes to keys which can take into account the possibility of unscheduled changes having occurred.

SUMMARY OF THE INVENTION

According to one aspect of the present invention there is provided a cryptographic key management method for use with a computer system including a first computer system and a second computer system, data flow from the first computer system to the second computer system being protected by cryptographic means employing one or more keys, wherein the or each key is scheduled to be changed at a respective scheduled time, but can be changed earlier at an unscheduled time if required, and wherein the or each key has a respective lifetime, the method including the step of calculating, for each key, a respective expiry time from its key lifetime, and the step of calculating a respective scheduled change time comprising a predetermined time before the expiry time.

According to another aspect of the present invention there is provided a computer system including a first computer system and a second computer system, data flow from the first computer system to the second computer system in use thereof being protected by cryptographic means employing one or more keys, the computer system further including a central system for generating the keys and delivering them to the first and second computer systems, the or each key having a respective lifetime and being scheduled to be changed at a respective scheduled time, although earlier unscheduled changes are possible, and comprising means for calculating, for each key, a respective expiry time from its key lifetime, and for calculating a respective scheduled change time comprising a predetermined time before the expiry time.

BRIEF DESCRIPTION OF THE DRAWING

Embodiments of the invention will now be described with reference to the accompanying schematic drawing of a business system to which key change scheduling according to the present invention is applicable.

SPECIFIC DESCRIPTION OF THE PREFERRED EMBODIMENTS

The illustrated example business system uses digital signatures and comprises a source computer system 1 and a destination computer system 2. In practice, the source and destination systems may each be complex distributed systems. In particular, the source or destination system may actually comprise a large number of physically separate nodes which are attached via a wide area network. It is assumed that the example system is such that operators 3 of the source system 1 are not authorised to handle the private key DSPR itself. Instead, the operators 3 have access to a token 4, illustrated as a diskette although it may alternatively be comprised, for example, by a smart card, on which is loaded a Key Encryption Key (KEK). The result of encrypting DSPR under KEK is written (DSPR)KEK. This encrypted value is stored within the source system, as illustrated schematically in the drawing. Operating systems access controls are configured to deny the operators the ability to extract the stored encrypted value. Prior to transmission of data, the source computer system 1 reads KEK from the token 4 and uses it to decrypt the stored value of (DSPR)KEK. This method allows the source system to load the private key DSPR into volatile memory while never exposing it to permanent storage. The Key Encryption Key may be used to protect the delivery of other cryptographic keys to the source system 1, for example keys used to encrypt data within the source system, in the same way.

As mentioned above, good cryptographic practice requires all keys to be changed at regular intervals. To enforce this, all keys are considered to have an expiry time after which they must not be used. Public key certificates may include the expiry time so that this rule can be policed by the verifying software.

A key is considered to be in use from the point in time when it is first introduced onto the system that uses it, to the time at which it and all keys or data it protects has been verified (in the case of digital signatures), or purged from the system (in the case of encryption).

The lifetime of keys is a security policy judgement and varies from key type to key type. The defined lifetime for a key type K may be written as LIFETIME(K). For the purposes of scheduling key changes, it is convenient to consider DSPR and DSPU to be two parts of one key DS. For example, with this convention, the values might be:

LIFETIME(KEK)=3 months and LIFETIME(DS)=6 months

It should be noted that these are upper bounds. It is within the security policy to change a key more frequently than its policy lifetime might suggest. In fact, it is necessary to do this to maintain the security policy.

If a key becomes compromised, then good cryptographic practice dictates that operational use of that key be suspended. The key then needs to be changed so that business can proceed using a new uncompromised key. However, the key is not changed automatically, rather business needs are taken into account for deciding when to change them. The above policies on key lifetimes will continue to apply, i.e. LIFETIME(DS)=6 months, etc, so the scheduling of key changes must take into account the possibility of unscheduled key changes having been instigated when assessing key lifetimes.

If a digital signature private key DSPR is compromised, then the corresponding public key DSPU must be rendered invalid, for example by revoking the certificate that guarantees it. In other words, the destination system must be instructed not to treat messages signed with the compromised key as valid.

The key material is delivered to the source and destination systems 1 and 2 from a central system 5, which is able to provide automated and/or manual processes, by adequately secure means which do not form part of the present invention and which are not discussed in detail herein. Suffice it to say that those skilled in the art will be able to perform key delivery without difficulty. The key material comprises the key types KEK and DSPR for the source system 1, DSPR being delivered using KEK, that is it is delivered as (DSPR) KEK, and the key type DSPU for the destination system 2. Human-operated or automated protocols must clearly exist to ensure co-ordination of the key deliveries. It is assumed that the maximum time taken to generate and deliver a key K, perhaps allowing for contingencies such as systems failure, is to be known as DELIVERYTIME(K). The central system 5 generates the keys and transmits them (delivers) to the source and destination systems, as well as calculating scheduled change times for each key. The latter can be achieved automatically or manually, such as in response to input by a security officer 6.

As key changes occur, there can be a requirement for the systems to retain old copies of key material for short periods, in order to continue doing business. Therefore, at any time a system may contain several versions of the key types it uses. Successive versions of a key type K can be written $K_1$, $K_2$, $K_3$ etc.

Clearly there is a requirement that key changes must not disrupt the business operation. In particular, in the illustrated example the source system 1 must always be provided with at least one valid pair of versions of the DSPR and KEK key types, so that it is always able to sign messages, whilst the destination system must have enough versions available of the DSPU key type to enable it to process all valid messages that it may be receiving. A new version of the DSPR key type must not be put into service in the source system until the corresponding version of the DSPU key type is available to the destination system.

The latency of a message passing through the system shown in the drawing is defined to be the interval between the time at which the message is signed and the time at which it is verified. The maximum permitted value for the message latency, MAX_LATENCY, is determined by the business operation of which the data flow plays a part. For example, it might be derived from a known limit on the validity of the business data in the messages, or from a knowledge of the communications link and the destination system. A particular example is that of a message authorising a payment which is to remain valid for three months from the date on which it was generated and signed. During that time the signing key may have expired, but the signature must still be valid.

If MAX_LATENCY cannot be determined, that is there is no upper limit on the interval between signature and verification, or if a maximum value can be determined but it exceeds the lifetime of the DSPU i.e. LIFETIME(DSPU), then the security policy is inconsistent with the business requirement. The method of determining MAX_LATENCY is dependent on the business logic of the application for the business operation, and as such is not discussed further herein.

In the event of a private key compromise, the current version of the DSPU must be revoked. To restore business functionality, it is then desirable to change the DSPR key quickly. To facilitate this, the destination system 2 can be supplied in advance with a spare version of the DSPU key type. When a DSPR needs to be changed in the event of a compromise, the version of DSPR corresponding to the DSPU spare can be put into immediate use in the source system 1 as soon as it is supplied. This obviates delay problems which might arise with delivery of a new DSPU key to all destination systems. Since the public and private keys are generated in pairs, the use of spare public keys means that such pairs will have been pre-generated and that as a result the private key corresponding to the public key of such a pair which is supplied as a spare will not require to be generated when a key change is required. It will however need to be held securely after generation and then called up as required. Spare DSPU certificates will not be required if the system supports the transmission of the DSPU certificate with the signed messages.

In the above, various concepts employed in key change scheduling were referred to, namely key delivery, key versions, the necessity for liveness of the business operation at all times, message latency and spare public keys. Methods involved in key change scheduling will now be discussed.

With regard to expiry times, all times need to be calculated with some agreed precision, hours or days would be suitable for many applications. The time when a formula is evaluated is written NOW( ). Whenever a version, $K_n$, of a key type K is put into service, an expiry time is calculated and recorded for that key as follows:

EXPIRYTIME($K_n$)=NOW( )+LIFETIME(K)

EXPIRYTIME($K_n$) is the latest possible time for changing the key which is permitted by the security policy. In fact, the key will normally be changed earlier.

For scheduled key changes, the following values should be calculated, namely

CHANGETIME(KEK)=EXPIRYTIME(KEK)—DELIVERYTIME(KEK)

and

CHANGETIME(DS)=EXPIRYTIME(DS)—MAX_LATENCY—DELIVERYTIME(DS)

It is assumed that the KEK's expiry time is related to the time of its last use for encryption, not the last time of a decryption of KEK encrypted data. This is acceptable since the encryption to decryption period is short. By doing this any consideration of KEK latency is excluded.

If CHANGETIME(K)≧ NOW( ), it is now the scheduled time to install a new version of key type K. However, this may also trigger changes to other keys, as will be apparent from the following.

The timing for unscheduled key changes is based on business decisions and risk analysis in the case of key compromise or other problems. When an unscheduled key change is instigated by the security officer 6 for the overall system, the expiry time for the new key is calculated as above.

If the unscheduled key change involves a change to DSPR and a spare DSPU key is available, the security officer can change to the version of DSPR corresponding to the spare DSPU key, once this DSPR has been received. This means that the change can be effected by a change at the source system only. When a spare DSPU key is put in use, a new spare DSPU key can be sent to the destination systems in case of a further compromise. However, in this case the expiry time for the spare sent out is to be calculated as the same as the key for which it is a spare. This is because the spare DSPU key should be considered to be in service as soon as it has been made available to the destination systems, since its confidentiality is put at some risk by exposing it there. This simplifies the calculations that must be made in the event of key compromise, since expiry times do not have to be dynamically recalculated. Hence, since the key expiry time is considered to be unchanged by the unscheduled key change, the time for the next scheduled key change will also remain the same as that calculated for the first key version.

As discussed above, the key type DSPR is delivered encrypted using the Key Encryption Key, KEK, and it may be referred to as a protected key. When either of these keys is changed, the dependency between them needs to be considered.

Whenever KEK is changed, the DSPR key should be changed also. If the KEK is being changed then it can be assumed that either the KEK has been compromised, or that it has been in use long enough for an attacker to have cracked it. Thus it can be assumed that the DSPR is compromised also.

When DSPR undergoes a scheduled change, if the current version of KEK will expire before the new version of DSPR then, to avoid having to change the DSPR again when the KEK expires, KEK is also changed. Note that this implies that the EXPIRYTIME(DSPR) should not be set to be longer than EXPIRYTIME(KEK), and thus that when DSPR undergoes an unscheduled change, in fact KEK should also be changed.

The key scheduling as described above is particularly appropriate when individual messages are short and traffic volume is high, so that the overhead of sending public key certificates with each message would be excessive.

What is claimed is:

1. A cryptographic key management method for use in a computer system, wherein communications between different locations within the system are protected by cryptographic means employing at least one current key, the method including the steps:

(a) scheduling the current key to be changed at a scheduled change time;
   (b) creating a spare key;
   (c) scheduling the spare key to be changed at the same scheduled change time as said current key; and
   (d) in the event of the current key being compromised, substituting the spare key for the current key, to allow communications to continue with minimum interruption.

2. A method according to claim 1 wherein the step of scheduling a key to be changed at a scheduled change time includes:

(a) determining a key lifetime according to the key type;
   (b) calculating a key expiry time by adding said key lifetime to a current time; and
   (c) calculating the scheduled change time by subtracting a predetermined time interval from said key expiry time.

3. A method according to claim 2, wherein said predetermined time interval includes a maximum key generation and delivery time.

4. A method according to claim 3, wherein said current key comprises a public key used to verify messages signed by a corresponding private key, and wherein said predetermined time interval further includes a maximum permitted time interval between signing and verification of any of said messages.

5. A method according to claim 1, wherein a said current key is delivered under encryption by a key encryption key, wherein a respective scheduled change time is calculated for the current key and for the key encryption key, and including the step of changing the current key whenever the key encryption key is changed, including unscheduled changes thereof.

6. A method as claimed in claim 5, including the step of changing the key encryption key whenever the current key undergoes a scheduled change.

7. A computer system comprising:

(a) cryptographic means employing at least one current key for protecting communications between different locations within the system;
   (b) means for scheduling the current key to be changed at a scheduled change time;
   (c) means for creating a spare key;
   (d) means for scheduling the spare key to be changed at the same scheduled change time as said current key; and
   (e) means for substituting the spare key for the current key, in the event of the current key being compromised, to allow communications to continue with minimum interruption.

8. A system according to claim 7 wherein the means for scheduling a key to be changed at a scheduled change time includes:

(a) means for determining a key lifetime according to the key type;
   (b) means for calculating a key expiry time by adding said key lifetime to a current time; and
   (c) means for calculating the scheduled change time by subtracting a predetermined time interval from said key expiry time.

* * * * *